US008027691B2

(12) United States Patent
Bernas et al.

(10) Patent No.: US 8,027,691 B2
(45) Date of Patent: Sep. 27, 2011

(54) METHOD AND APPARATUS FOR PROVIDING POSITION PROFILES IN MOBILE VALUE-ADDED SERVICES

(75) Inventors: Anette Bernas, Helsinki (FI); Jukka Heiska, Espoo (FI); Jukka Nihtila, Espoo (FI); Seija Salmela, Masala (FI)

(73) Assignee: Nokia Corporation, Espoo (FI)

( * ) Notice: Subject to any disclaimer, the term of this patent is extended or adjusted under 35 U.S.C. 154(b) by 1206 days.

(21) Appl. No.: 10/638,256

(22) Filed: Aug. 6, 2003

(65) Prior Publication Data
US 2004/0077359 A1    Apr. 22, 2004

Related U.S. Application Data

(63) Continuation of application No. PCT/IB01/00164, filed on Feb. 8, 2001.

(51) Int. Cl.
*H04W 24/00* (2009.01)
(52) U.S. Cl. ............... 455/456.3; 455/432.1; 455/435.1; 455/414.1; 455/414.2; 455/456.1; 455/456.2; 455/456.5; 455/456.6; 455/418; 455/419
(58) Field of Classification Search .... 455/456.1–456.6, 455/414.2, 457, 432.3, 414.3, 404.2, 414.1, 455/414.4, 433, 432.1, 435.1; 705/1, 11, 705/14; 342/357.07, 357.1; 701/209, 213, 701/215
See application file for complete search history.

(56) References Cited

U.S. PATENT DOCUMENTS

| | | | | |
|---|---|---|---|---|
| 5,852,775 A * | 12/1998 | Hidary | ........................ | 455/412.1 |
| 6,101,388 A * | 8/2000 | Keshavachar | .............. | 455/435.1 |
| 6,108,540 A * | 8/2000 | Sonti et al. | .................... | 455/433 |
| 6,122,520 A * | 9/2000 | Want et al. | ................. | 455/456.2 |
| 6,317,718 B1 * | 11/2001 | Fano | ................................ | 705/1 |
| 6,360,102 B1 * | 3/2002 | Havinis et al. | ................ | 455/457 |
| 6,381,465 B1 * | 4/2002 | Chern et al. | .................. | 455/466 |
| 6,456,852 B2 * | 9/2002 | Bar et al. | .................... | 455/456.1 |
| 6,529,159 B1 * | 3/2003 | Fan et al. | ................. | 342/357.09 |
| 6,549,768 B1 * | 4/2003 | Fraccaroli | .................. | 455/456.3 |
| 6,560,640 B2 * | 5/2003 | Smethers | ...................... | 709/219 |
| 6,615,276 B1 * | 9/2003 | Mastrianni et al. | ........... | 709/250 |
| 6,618,593 B1 * | 9/2003 | Drutman et al. | ........... | 455/456.3 |
| 6,647,269 B2 * | 11/2003 | Hendrey et al. | ............ | 455/456.3 |
| 6,650,902 B1 * | 11/2003 | Richton | .................... | 455/456.3 |
| 6,748,195 B1 * | 6/2004 | Phillips | ........................ | 455/41.2 |

(Continued)

FOREIGN PATENT DOCUMENTS

| | | |
|---|---|---|
| EP | 1119211 | 7/2001 |
| EP | 1119211 A2 * | 7/2001 |
| WO | WO 97/41654 | 11/1997 |
| WO | WO9741654 | * 11/1997 |
| WO | WO 99/33293 | 7/1999 |

*Primary Examiner* — Olumide T Ajibade Akonai
(74) *Attorney, Agent, or Firm* — Ditthavong Mori & Steiner, P.C.

(57) ABSTRACT

A method and apparatus for providing position profiles in mobile value added services is disclosed. Users define, manage and use position profiles with mobile value-added services and utilize the personal position profile in context sensitive value-added services. The method includes defining at least one location profile associated with a user of a mobile terminal and storing the at least one location profile remote from the mobile terminal. A system for providing location profiles includes a mapping service provider, a node in a wireless network for providing location services to a user of a mobile terminal and an interface between the server and the mapping service provider, where the user defines at least one location profile and causes the at least one location profile to be stored at the node.

31 Claims, 3 Drawing Sheets

U.S. PATENT DOCUMENTS

| | | | | |
|---|---|---|---|---|
| 6,771,971 B2 * | 8/2004 | Smith | | 455/456.1 |
| 6,785,551 B1 * | 8/2004 | Richard | | 455/456.1 |
| 6,819,919 B1 * | 11/2004 | Tanaka | | 455/414.1 |
| 6,834,195 B2 * | 12/2004 | Brandenberg et al. | | 455/456.3 |
| 6,904,026 B1 * | 6/2005 | Tarnanen et al. | | 370/329 |
| 7,027,801 B1 * | 4/2006 | Hall et al. | | 455/412.1 |
| 7,085,555 B2 * | 8/2006 | Zellner et al. | | 455/414.1 |
| 2001/0053999 A1 * | 12/2001 | Feinberg | | 705/14 |
| 2002/0016173 A1 * | 2/2002 | Hunzinger | | 455/456 |
| 2002/0068573 A1 * | 6/2002 | Raverdy et al. | | 455/445 |
| 2002/0091568 A1 * | 7/2002 | Kraft et al. | | 705/14 |
| 2005/0002508 A1 * | 1/2005 | Elsey et al. | | 379/201.01 |

* cited by examiner

METHOD AND APPARATUS FOR PROVIDING POSITION PROFILES IN MOBILE VALUE-ADDED SERVICES

This application is a Continuation of International Application PCT/IB01/00164 with an international filing date of 8 Feb. 2001, which designated the U.S. and was published under PCT Article 21(2) in English, the content of which is incorporated herein by reference in its entirety.

BACKGROUND OF THE INVENTION

1. Field of the Invention

This invention relates in general to location information services, and more particularly to a method and apparatus for providing position profiles in mobile value added services.

2. Description of Related Art

In an age of ever-expanding information resources, such resources provide useful and potentially vital information for reliable and accurate decision making. At the same time, society is increasingly mobile, with people spending more and more time traveling to and from their offices, homes, and other destinations, usually in their automobiles or other forms of transportation.

A plethora of information resources and increasing mobility presents some unique problems in providing information services. When mobile, access to important information services may be effectively cut off, often when the information is needed most. Also, the information provided is often location-sensitive, that is, dependent upon the location of the requester or the subject of the request. In such instances, the location of the requester or subject must be determined, or the effectiveness of the information provided may be limited.

Location services enable customized information to be delivered or made available based on the specific location of the user. Knowing where the user is at any given time adds a valuable dimension to the kinds of services that can be offered. Mobile terminal users are in pursuit of just-in-time information. In other words, mobile phone users are looking for just the right information, at the right time, at the right location, on any device. Such information allows the users to make effective decisions and take immediate action. At some points in time we have all found a need to know, for example, where the closest restaurant is and how to get to it from wherever we happen to be at the moment. Alternatively, a person may be driving in their car and realize that they are lost. Accordingly, directions to the nearest open gasoline station would be helpful. If the location of the requester is unknown, step-by-step directions cannot be provided. Also, if the distance between the gas station and the requestor is unknown, the system may direct the person to a gas station which closed before the person arrives.

Location Application Services (also called Location-based Services) deliver end-user applications, normally based on knowing the position of a user with their mobile terminal. These services can be delivered through a wide range of devices, including wireless phones, WAP (Wireless Application Protocol) phones, on-board automobile wireless navigation systems, wireless PDAs (personal digital assistants) and other types of mobile terminals. Location Application Services also support operations throughout a location-enabled enterprise, including such applications as customer relationship management, accounting, network planning, inventory management, field service, network management, inside/outside plant, and so on.

Often we think of location information as the graphics and text that are captured on maps. However, location information is really much more. For example, there's geocoded information such as street addresses, postal codes and zip codes. There is also positional data that are captured for navigation purposes, like GPS, GSM and LORAN. Another example includes route information and directions that tell us how to navigate from one place to the next; time-sensitive events, like accident reports, weather reports and the location of service fleets. Directories, like the yellow pages; countless databases with demographic and psychographic data, customer data, asset inventories, etc. provide a source of information that is currently unavailable to a mobile user.

Soon every office, vehicle, mobile handset, and stationary device will be connected to a web of information service providers through the global information service infrastructure that is being developed on the backbone of the Internet. The global information infrastructure may depend on computers, networks, and interoperable software, but the main ingredient is information itself.

While value-added services for mobile phones are becoming commonplace, location services could be made more valuable. For example, the ability to tailor the application according to the subscriber's position is believed to significantly increase the value of the applications and services in question. Examples of this kind of functionality include proximity search, guidance and routing. A mobile phone user can already today be positioned either automatically based on the cell-id and timing advance from the mobile telephony network or by a GPS-assisted device or manually by asking the user to enter his current location (e.g. street address). However, these methods have significant problems that must be overcome before such location services are able to provide the desired value to mobile users.

For example, mobile network-based positioning (cell-id+ timing advance, E-OTD) is not capable of position accuracy that would enable guidance or routing applications. Yet, guidance and routing applications are inherently a vital component of many location-based services. In another example, the GPS-assisted device lacks coverage in "urban canyons" and indoor. Further, the manually keying in a street address, for example, is accurate, but overly cumbersome in the case of a mobile terminal user because of the limited text input capabilities of the device.

It can be seen that there is a need for method and apparatus for defining, managing and using position profiles with mobile value-added services.

It can also be seen that there is a need for a method and apparatus that enables mobile phone users to utilize their personal position profile in context sensitive value-added services.

It can also be seen that there is a need for a method and apparatus that define and manage the position profiles.

SUMMARY OF THE INVENTION

To overcome the limitations in the prior art described above, and to overcome other limitations that will become apparent upon reading and understanding the present specification, the present invention discloses a method and apparatus for providing position profiles in mobile value added services.

The present invention solves the above-described problems and provides other advantages by allowing users to define, manage and use position profiles with mobile value-added services. The present invention also enables a mobile user to utilize his personal position profile in context sensitive value-added services.

A method in accordance with the principles of the present invention includes defining at least one location profile associated with a user of a mobile terminal and storing the at least one location profile remote from the mobile terminal.

Other embodiments of a method in accordance with the principles of the invention may include alternative or optional additional aspects. One such aspect of the present invention is that the mobile terminal is a mobile phone.

Another aspect of the present invention is that the at least one location profile is stored in a wireless network node.

Another aspect of the present invention is that the wireless network node is a Wireless Application Protocol server.

Another aspect of the present invention is that the method further includes managing at least one characteristic of the at least one location profile.

Another aspect of the present invention is that the managing further comprises setting a location profile as a default location profile for the user of the mobile terminal.

Another aspect of the present invention is that the default location profile is used in all location-sensitive application requests made by the user of the mobile terminal.

Another aspect of the present invention is that the managing further comprises changing the default location.

Another aspect of the present invention is that the default location is changed manually through an interface.

Another aspect of the present invention is that the interface is a World Wide Web interface.

Another aspect of the present invention is that the interface is a Wireless Application Protocol interface.

Another aspect of the present invention is that the default location is changed automatically at a pre-programmed time.

Another aspect of the present invention is that the managing further comprises making the at least one location profile dynamically dependent on any application logic.

Another aspect of the present invention is that the managing further comprises adjusting definitions for the location profile regarding the validity of a set parameter.

Another aspect of the present invention is that the set parameter comprises a time for the at least one location profile to be valid.

Another aspect of the present invention is that the managing further comprises setting an accuracy level for the location profile, the accuracy level defining the level that is communicated.

Another aspect of the present invention is that the managing further comprises setting limits on the dissemination of the at least one location profile.

Another aspect of the present invention is that the setting limits on the dissemination of the at least one location profile allows the user to disable any content site that the user does not want to provide a current position.

Another aspect of the present invention is that the managing further comprises categorizing the at least one location profile to form groups.

In another embodiment of the present invention, a system for providing position profiles is provided. The system includes a node in a wireless network for maintaining location services to a user of a mobile terminal and an interface between the node and the mobile terminal, wherein the user defines at least one location profile and causes the at least one location profile to be stored at the node.

Another aspect of the present invention is that the node is a Wireless Application Protocol server.

Another aspect of the present invention is that the mobile terminal is a mobile phone.

Another aspect of the present invention is that the interface allows the user to manage at least one characteristic of the at least one location profile.

Another aspect of the present invention is that the interface allows the user to set a location profile as a default location profile for the user of the mobile terminal.

Another aspect of the present invention is that the default location profile is used in all location-sensitive application requests made by the user of the mobile terminal.

Another aspect of the present invention is that the system further includes a second interface for a World Wide Web interface.

Another aspect of the present invention is that the interface allows the default location to be pre-programmed to automatically change.

In another embodiment of the present invention, an article of manufacture comprising a program storage medium readable by a computer is provided. The medium tangibly embodies one or more programs of instructions executable by the computer to perform a method for providing location profiles, the method including defining at least one location profile associated with a user of a mobile terminal and storing the at least one location profile remote from the mobile terminal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for providing position profiles in mobile value added services. The present invention allows users to define, manage and use position profiles with mobile value-added services. The present invention also enables a mobile device user to utilize his personal position profile in context sensitive value-added services.

Figure 1:
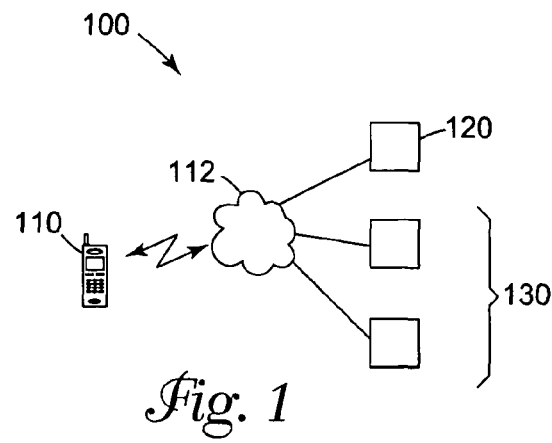
FIG. 1 illustrates a block diagram of a networking architecture for location services in which the principles of the present invention may be applied.

FIG. 1 illustrates a block diagram 100 of a networking architecture for location services in which the principles of the present invention may be applied. In FIG. 1, a mobile terminal 110 communicating with a network 112. A remote node 120 having position profiles is coupled to the network 112. One or more service providers 130 are also coupled to the network 112. The user of the mobile terminal 110 may use the same position profiles independently of which service provider 130 the user's mobile terminal 110 is entering.

Figure 2:
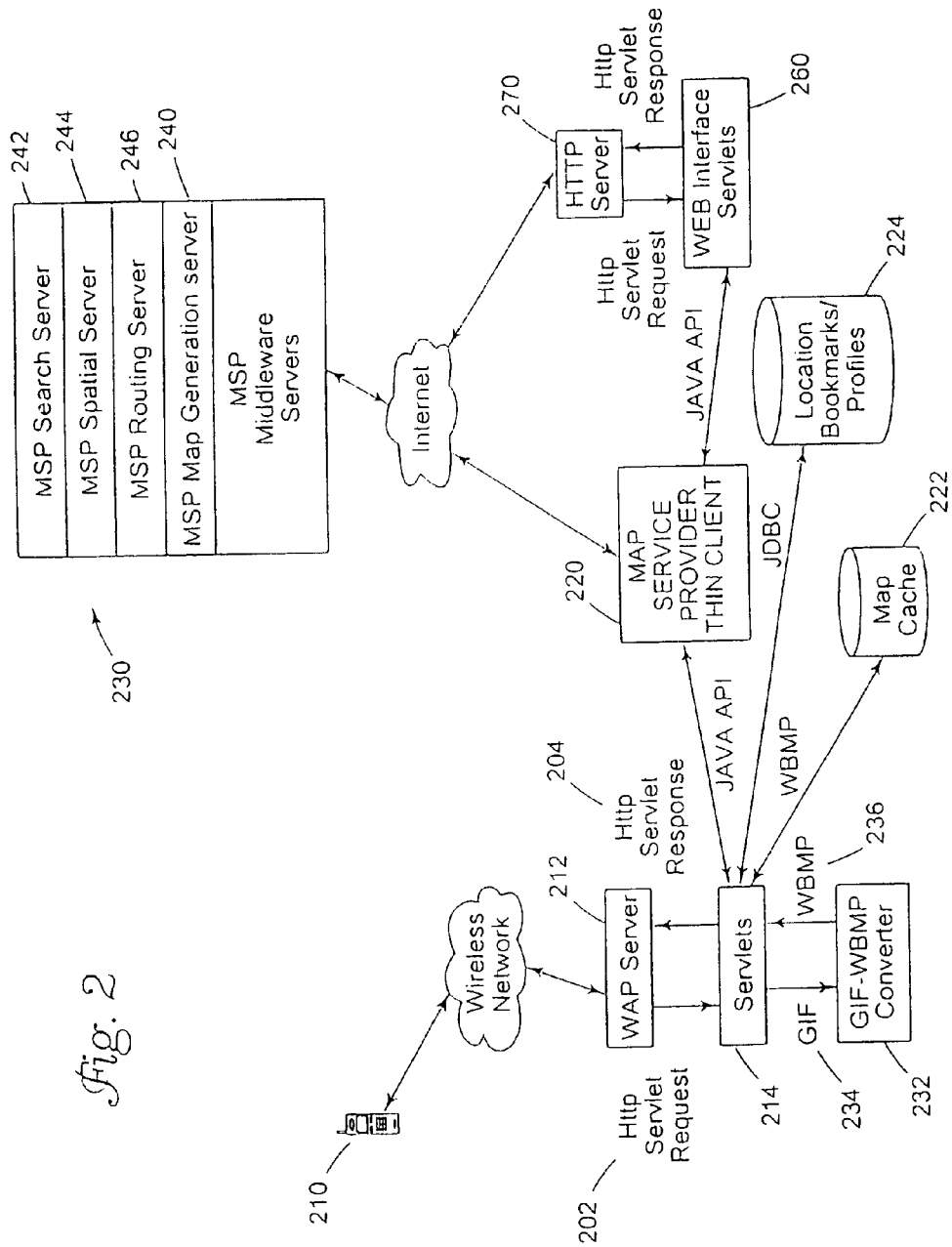
FIG. 2 illustrates a block diagram showing a more particular embodiment of a location services architecture according to the present invention.

FIG. 2 illustrates a block diagram 200 of a location services architecture according to the present invention. In FIG. 2, a mobile terminal 210, e.g., a WAP compliant phone, PDA, etc., accesses a WAP server 212. Those skilled in the art will recognize that the present invention is not meant to be limited to a particular mobile Internet approach, e.g., i-mode, WAP, cHTML (compact HTML), HDML (handheld device markup language), etc. Nevertheless, the present invention will be explained with reference only to WAP technology for clarity and brevity. The WAP server 212 merely represents a node within a wireless network.

The WAP server 212 provides requests to servlets 214 which access a map service provider thin client 220, a map cache 222 or storage 224 for storing location profiles and bookmarks. A location profile is a geographic location associated with a user having parameters and characteristics, of which at least some may be configured by the user. The map service provider thin client 220 accesses a map database 230 via the Internet. As will be explained in greater detail below, the map database 230 may be centralized or distributed. Further, in the case of distributed databases, several different entities may independently provide a database.

Locator-type services are services provided by companies with a specific customer base. Customarily locator-type service providers have a database containing branch locations and the details of those locations. The service providers could allow their customers to perform "Find nearest . . . " searches of their location databases by using the proximity search function provided by a map service provider (MSP), as well as offer driving directions to the closest locations returned.

A bank could for example provide a "Find nearest ATM" service to their customers, as well as driving directions to the closest ATMs found. Another example of a locator-type service is a real estate company that stores the locations of its real estates and the details of the real estates in a database. The real estate company could provide its customers with a proximity search service to find the nearest real estate in the area according to some properties specified by the user such as price range or type of real estate. The service providers could include in their applications the location bookmarks that have been developed. In the real estate company example, a house-searching user could save the location of a house returned by the proximity search. Later when users want to visit the place, they can ask for driving directions without performing the proximity search again by using the user's location profiles and selecting as a destination the preferred house from the realty's location bookmarks.

A general travel service could be similar to the application developed in the embodiment, providing maps, driving directions, and a proximity search service. Travelers could ask for driving directions to airports, hotels, museums, and other places of interest to the traveler, as well as perform searches in the local area for the closest restaurant, post office, car rental, pharmacy, amusement park etc. For the proximity search function the travel service would need a database containing a broad range of locations, similar to the Yellow Pages. The address information of the closest places found could be paired with any other available data, such as telephone number or opening hours.

In addition to providing the location bookmarks tailored according to user input, a travel service could include predetermined location bookmarks in the service. A travel service such as a tourist guide of a city could for example offer a list of location bookmarks containing the tourist attractions in the city, or a list containing the city's airport, railway station, bus station and taxi stations.

When the WAP Server 212 receives a request from a WAP phone 210, it forwards the request as an HttpServletRequest 202 to the correct servlet. The servlet 214 processes the request and creates a client object for the communication with the MSP servers 230 according to what the user requested. The Java API of the MSP thin client 220 allows the servlet 214 to create client objects with the correct attributes according to what type of input the different MSP servers 230 require. The servlet 214 connects to the appropriate server 230 via the client object and retrieves the requested data. By using the Java API, the servlet 214 is able to work with software objects when processing the response from the server 230, instead of parsing the response byte-by-byte. The servlet 214 uses the provided HttpServletResponse 204 to send the WML response to the WAP phone 210 via WAP Server 212.

Since the size of the WML response sent to the mobile terminal 210 must be within certain limits, it is necessary to divide one response into several decks. The servlet 214 saves the objects representing the response data from the servers 230 in the HttpSession. When the user navigates between decks that belong to the same response, the servlet retrieves the objects from the HttpSession and processes the objects in order to build the WML deck to be sent as response to the user.

An image-processing converter 232 is used to convert the GIF images 234 produced by the MSP Map Generation server 240 to WBMP (Wireless Bitmap) format 236. The servlet 214 spawns a separate process to execute the program in the runtime environment. The GIF data 234 is fed directly to the output stream of the process in order to avoid saving the GIF image on disk.

A cache 222 is implemented for saving the maps. When the servlet 214 handling the requests for maps receives a request 202, it checks the map cache 222 to see if a map with the same center coordinates and scale is found in the cache 222. If such a map is found, the servlet 214 can return the map directly to the mobile terminal 210 without connecting to MSP Map Generation server 240. If the map contains shape points for displaying Point Of Interest (POI) icons or a highlighted driving route, the map needs to be saved in the cache 222 according to the shape points in addition to the center coordinates and scale. A SQL database may be used for mapping the image names to the map attributes.

The map service provider (MSP) thin-client 220 provides access to the MSP servers 230. The MSP thin client 220 communicates with the MSP servers 230 through an extended HTTP protocol. The MSP thin client 220 comprises Java and C++ APIs (Application Programming Interfaces), which encapsulate the functionality of the extended HTTP protocol.

The APIs generate the required HTTP protocol for the client/server interactions over the Internet. All of the HTTP protocol generation, encryption and parsing is handled in the Java libraries, which makes the use of the extended HTTP protocol invisible. By using the APIs, software objects representing maps, maneuvers, clients, locations, etc. can be developed without talking HTTP directly with the servers 230.

As explained briefly above, the MSP database 230 for storing all maps and routes may be distributed, wherein mapping, routing and geocoding data may be licensed and integrated from data-providers worldwide to dynamically produce the maps and directions from vector data when they are requested.

MSP middleware servers 230 provide mapping, geocoding, routing and spatial searching functionality. The MSP Search server 242 performs geocoding, i.e. converts an address to GPS latitude and longitude coordinates. Input to this server is a full or partial address. The input format of the address and the output returned by this server will be described herein below. The proximity search functionality allows users to perform searches in the local area for the nearest hotel, restaurant, ATM, gas station etc. In addition to the addresses of the closest places found, an overview map with icons marking the locations is displayed. The user may save the locations returned as location bookmarks.

The MSP Spatial Server 244 provides proximity searching capabilities. The search origin is specified to this server 244 as latitude and longitude coordinates. Other attributes such as the shape and size of the region to be searched may also be input. The MSP Spatial Server 244 returns a list of every "Point Of Interest" (POI) that resides within the predefined geographic region, as well as information that can be sent to the MSP Map Generation server 240 to produce a map showing icons that highlight the POIs. "Closest" is defined in terms of shortest distance.

The MSP hosts the POI data on the customer's behalf, but does not provide any general search database. The customer sends the POI data to the MSP, for example, with the FTP protocol. Alternatively, the customer may host a POI database of his own, which can be searched.

The MSP Routing Server 246 produces driving directions for specific geographic areas, e.g., North America and Europe. Input to the MSP Routing Server 246 may be a full or partial address, similar to the input to the MSP Search Server 242. The MSP Routing Server 246 generates textual driving instructions divided into detailed maneuvers, as well as information that can be sent to the MSP Map Generation server 240 to produce maneuver maps with highlighted routes. It is possible to input only the coordinates of the origin and/or destination, but the MSP Routing Server 246 will only return driving directions for coordinates known by the MSP, i.e. coordinates that could have been the result of a geocode request.

The routing functionality provides driving directions from the user's current location to a destination. Users may either select the destination from the location profiles or enter the address of the destination. The input format of the address is similar to the input format to the geocoding service described above. If the input is ambiguous, the user will be asked to select one of the addresses returned.

In addition, users may enter the GPS coordinates of the destination directly. However, if the destination is entered as coordinates or if the origin/destination is a location profile manually entered as coordinates without any address information, the MSP may not provide driving directions from/to this location. Routing is supported between coordinates that the MSP recognizes, i.e. coordinates resulting from a geocode request, or the system associates locations with address information. The mapping and proximity searching functions do not have this restriction.

Users may choose to receive the driving directions either for fastest drive time or shortest distance, and whether the driving directions should be returned as text only or include both text instructions and maps. In addition, users may choose to avoid toll roads, ferry lanes and limited access highways.

The routing information may include detailed maneuver instructions including the estimated distance as well as a map where the described route is highlighted for each maneuver. In addition, an overview map may be provided to show the entire highlighted route as well as the total distance and estimated time. The time and distance estimates are particularly helpful for users in automobiles. In addition to the routing and proximity search maps, a map of the user's current location including zooming and relocating capabilities may be provided.

The MSP Map Generation server 240 generates map images in GIF format given the latitude and longitude coordinates of the map center and other map attributes such as size, style, etc. The input to this server 240 may also include shape points for displaying POI icons or a highlighted route for driving directions.

Preferably, in order to use the WAP Server 212 both as the origin server and the WAP gateway, the Java programming environment is implemented as Java servlets running on the WAP Server 212. The Java API of the MSP thin client 220 is used to communicate with the MSP middleware servers 230: MSP Search 242, MSP Spatial 244, MSP Routing 246, and MSP Map Generation 240.

The WWW service providing geocoding and bookmarking functionality comprises Java servlets 214 for producing HTML pages. The servlets 214 use JDBC (Java Database Connectivity) to connect to the database 224 and the Java API of the MSP thin client to communicate with the MSP Search server 242.

To access location services, the user provides manually the application with the coordinates of his current location. Since users tend to know the address of a location rather than the coordinates, the MSP 230 provides a geocoding function to convert addresses into the corresponding GPS latitude and longitude coordinates. The input format of the address may, for example, be a full or partial street address, city, state (US only), ZIP/Postal code and/or country. The user may submit a location with some (or even most) details missing. However, the more details supplied, the more tightly the MSP can focus on the exact location.

The search will yield the most precise GPS latitude and longitude coordinates that the MSP is able to provide paired with other available address data. For large regions (e.g. city), the coordinates returned specify the region's geographic center. The search quality specifies how precisely the MSP 230 was able to pinpoint the coordinates. The search quality is either "Street Address" (street number and address), "Street General" (no street number), "Street Intersection", "City", "County", "State" or "Country". If the input was ambiguous, the MSP 230 will return the coordinates of all the "hits" that match the input. For example, if the user submit the street name "Oakview", not knowing that the same city contains an "Oakview Street", "Oakview Boulevard", and "Oakview Lane", the MSP 230 will return data for all three, and the user can then select one of the locations.

As mentioned above, bookmarks may be stored to allow users to save the coordinates returned by the geocoding service for later retrieval. If users know the GPS coordinates of their current location, they may also enter the coordinates directly as a location profile. When users want to update their current position, they can select their new location from the locations that has been stored in storage 224. This is more convenient, as well as faster, than performing a geocode search. The location profiles are not restricted only to selecting a user's current location. When asking for driving directions, users may select the destination from the location bookmarks in addition to entering the address or coordinates of the destination. In order to avoid large selection lists in the WAP service, the user may maintain several lists of location bookmarks.

In order to facilitate the management of the location profiles, a WWW interface 260 via a HTTP server 270 to the geocoding and bookmarking services is provided. For example, when planning a trip, user can geocode and bookmark addresses they are planning to visit using the WWW service in order to save time by not having to input and geocode addresses on the road with the WAP phone 210.

As described above, a user of a mobile terminal 210 can be positioned either automatically based on the cell-id and timing advance from the mobile telephony network or by a GPS-assisted device or manually by asking the user to enter his current location (e.g. street address). Yet, as mentioned, these methods have significant problems that must be overcome before such location services are able to provide the desired value to mobile users. Therefore, position profiles provided according to the present invention may be used to overcome the above limitations.

Figure 3:
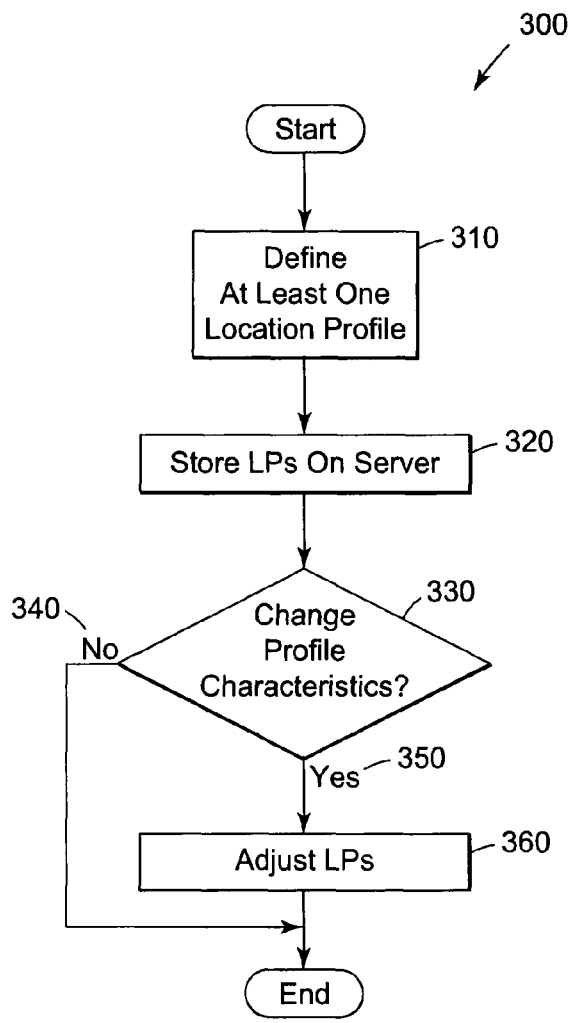
FIG. 3 illustrates a flow chart for using and managing location profiles according to one embodiment of the present invention.

FIG. 3 illustrates a flow chart 300 for using and managing location profiles according to one embodiment of the present invention. In FIG. 3, a user defines at least one location profile 310. The at least one location profile is then stored on a server 320, which is preferably a WAP server 212. Thereafter, the user may change profile characteristics 330, which will be described in more detail with reference to FIG. 4. If the user does not wish to change profile characteristics 340, the process ends. If the user desires to change profile characteristics 350, the location profiles are adjusted 360.

In one embodiment of the present invention, the user of the mobile terminal 210 may define any number of locations. The definition can be done either WAP 212 or Web 260 interface. These location definitions constitute the users position profile, which is stored, preferably, on a Wireless Application Protocol (WAP) server 212. The location definitions can also be categorized 330 to form groups (both temporary and permanent). For example, the user can form a group of positions related to free time and another related to a specific voyage.

Figure 4:
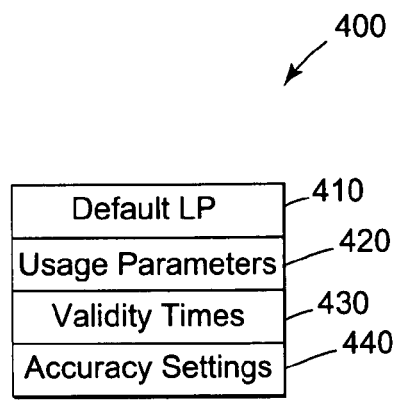
FIG. 4 illustrates characteristics of the location profiles according to a more particular embodiment of the present invention.

FIG. 4 illustrates characteristics 400 of the location profiles according to a more particular embodiment of the present invention. For example, one location may be chosen as the default location of the user 410. This position is then used in all location-sensitive application requests, which are mediated via the WAP server. Usage parameters of the location profiles may be changed. For example, the default location can be changed by the user manually (via Web or WAP interface) or it can be pre-programmed to change e.g. at a specific point of time. Furthermore, the location profiles can be made dynamically dependent on any application logic, which is somehow related to the user's position and time. For example, the default location of the user can be derived from the user's calendar application if so chosen.

In addition to the street level address information, the location definitions can contain information regarding the validity time of the location (i.e. a location can be made automatically as the default location for the profile for a given time) as well as other personal user-specific attributes 430.

The position profile also enables the user to set the accuracy level 440, which is communicated, to the location-based application. For example, the user may define that at certain time only street names are communicated as his position or even only the city where he currently is.

Referring again to FIG. 2, the above functionality can be combined with mobile telephony network-based positioning. For example, if the WAP server 212 receives a cell-id from the network, the position profile can either fix that position to a street level address or in the opposite way generalize the cell-id into the name of the current city. The position profiles also enable the user to control the destination of his position information; i.e. he can disable any content site to which he does not want to communicate his current position.

The examples of pre-programming, wireless network-based positioning and automatic locating the mobile terminal are based on locating the mobile terminal in the mobile network by the provision of location data of each mobile terminal. The invention does not limit the way through which such location data will be obtained. There are several known ways for locating a mobile terminal, such as those described, for example, in patent publications EP 933961 and EP 917385, which are incorporated herein by reference. Most location methods described in said patent publications are so-called OTD-methods (Observed Time Difference) or TDOA-methods (Time Difference Of Arrival) which means that either the mobile terminal or the network or both measure the arrival times and/or time difference between the arrivals of certain radio signals through at least three base stations. When the locations of the base stations and the propagation velocity of radio waves are known, it is possible to calculate the location of the mobile terminal from the observed time factors. The Location Service Center (LSC) maintains the location database in the network.

An additional applicable method for locating a mobile terminal is known from the method wherein a simple low-power transmitter, for example a Bluetooth transmitter, is installed at a known location and programmed to transmit regularly an identification signal. The transmission power of the simple transmitter is low enough and its coverage correspondingly small enough so that a mobile terminal that is able to receive its transmission may be regarded to be essentially at the same location as the simple transmitter. When the mobile terminal has received a low-power transmission from a simple transmitter, it transmits to the network a message indicative of the successful reception of the identification signal contained in the transmission. On the basis of said message the network finds out and stores the known location of the mobile terminal. If the network knows the location coordinates of the identified simple transmitter, it may inform the mobile terminal by sending a message like "you have received the transmission of the simple transmitter ABC, so you are at location XX, YY, ZZ". Another alternative is that the simple transmitter does not transmit an identification signal but simply the coordinates of its location at a low transmission power, whereby a terminal that is able to receive its transmission may regard itself as being essentially at the indicated location.

An alternative is also that the mobile terminal includes a built-in positioning subsystem like the GPS (Global Positioning System) receivers known today. In such a case it is very straightforward for every mobile terminal to know its location, because it gets the necessary information regularly from the positioning subsystem.

Figure 5:
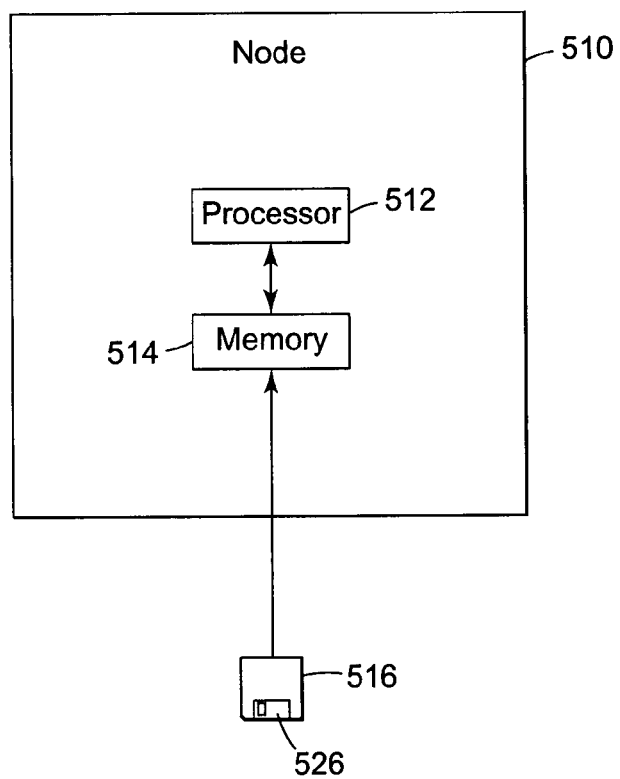
FIG. 5 is a block diagram that illustrates an exemplary hardware environment for performing the method for providing location profiles according to the present invention.

FIG. 5 is a block diagram 500 that illustrates an exemplary hardware environment for performing the method for providing location profiles according to the present invention. The present invention is typically implemented using a node 510 comprised of a processor 512 and memory 514. The node 510 executes one or more computer programs represented by the block 526, which may be tangibly embodied in a computer-readable medium or carrier 516. The computer programs 526 may be loaded into the memory 514 of the node 510 for execution by the processor as discussed above with reference to FIGS. 1-4. The computer programs 526 comprise instructions which, when read and executed by the processor of the node 510, causes the node 510 to perform the steps necessary to execute the steps or elements of the present invention. The computer program 526 may also be data transferred in the network environment from the node to another node.

Although an exemplary node is illustrated in FIG. 5, those skilled in the art will recognize that any number of different configurations performing similar functions may be used in accordance with the present invention.

In order to have a "current position" and to use location bookmarks, the user may need to identify himself to the service with a username and password. The identify of the mobile terminal such as a mobile phone number is applicable to identify user and user does not have to log in with username and password every time he enters the service.

The MSP Map Generation server 240 may also be able to produce WBMP maps optimized for WAP applications directly. In this example there would not be a need to GIF WBMP conversion which reduce the delay, that appears when user request a map, and the response from the map generation server is delayed because of performing the GIF-WBMP conversion before the map is sent to user.

In the example of positioning from the network, if the user's position is discovered from the network, the coordinates from the coordinate system used by the network are converted to the coordinate system that the MPS servers 130 support.

In the example of delivering position of the user automatically to the user by the network, the location bookmarks are applicable for bookmarking locations that the user visits frequently. By bookmarking the coordinates of a frequently visited location (e.g. the user's home or office), the user would not need to request the coordinates from the network every time he is located at this location.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method comprising: receiving at an apparatus at least one location profile defined by a user of a mobile terminal, wherein the at least one location profile is stored in a wireless network node, and each of the at least one location profiles is associated with a respective location and is stored for subsequent selection by the user; setting at the apparatus for the user without user intervention one of the at least one location profile as a current location profile by applying an application logic of one or more user locations, one or more time points, or a combination thereof; and determining to invoke at least one service by the apparatus to receive location-sensitive content that is tailored to a location associated with the current location profile.

2. The method of claim 1 wherein the apparatus comprises the mobile terminal, and the mobile terminal is a mobile phone.

3. The method of claim 1, wherein the at least one location profile is bookmarked at the apparatus.

4. The method of claim 3 wherein the wireless network node is a wireless application protocol (WAP) server.

5. The method of claim 1 further comprising managing at least one characteristic of the at least one location profile.

6. The method of claim 5 wherein the managing further comprises setting a location profile as a default location profile for the user of the mobile terminal.

7. The method of claim 6 wherein the default location profile is used in all location-sensitive application requests made by the user of the mobile terminal.

8. The method of claim 6 wherein the managing further comprises changing the default location.

9. The method of claim 8 wherein the default location is changed manually through an interface.

10. The method of claim 9 wherein the interface is a World Wide Web interface.

11. The method of claim 9 wherein the interface is a wireless application protocol (WAP) interface.

12. The method of claim 8 wherein the default location is changed automatically at a pre-programmed time.

13. The method of claim 6 wherein the application logic includes a user calendar application.

14. The method of claim 6 wherein the managing further comprises adjusting definitions for the location profile regarding the validity of a set parameter.

15. The method of claim 14 wherein the set parameter comprises a time for the at least one location profile to be valid.

16. The method of claim 6 wherein the managing further comprises setting an accuracy level for the location profile, the accuracy level defining the level that is communicated.

17. The method of claim 6 wherein the managing further comprises setting limits on the dissemination of the at least one location profile.

18. The method of claim 17 wherein the setting limits on the dissemination of the at least one location profile allows the user to disable any content site that the user does not want to provide a current position.

19. The method of claim 6 wherein the managing further comprises categorizing the at least one location profile to form groups.

20. The method of claim 1, wherein the apparatus comprises the mobile terminal, and the mobile terminal is a mobile phone.

21. An apparatus comprising: at least one processor; and at least one memory including computer program code, the at least one memory and the computer program code configured to, with the at least one processor, cause the apparatus to perform at least the following: receive at least one location profile defined by a user of a mobile terminal, wherein the at least one location profile is stored in a wireless network node, and each of the at least one location profiles is associated with a respective location and is stored for subsequent selection by the user; set for the user without user intervention one of the at least one location profile as a current location profile by applying an application logic of one or more user locations, one or more time points, or a combination thereof; and determine to invoke at least one service to receive location-sensitive content that is tailored to a location associated with the current location profile.

22. The apparatus of claim 21 wherein the at least one location profile is bookmarked at the apparatus, and stored in a wireless application protocol (WAP) server.

23. The apparatus of claim 21 wherein the apparatus comprises the mobile terminal, and the mobile terminal is a mobile phone.

24. The apparatus of claim 21 wherein the apparatus is further caused to manage at least one characteristic of the at least one location profile.

25. The apparatus of claim 24 wherein the apparatus is further caused to set a location profile as a default location profile for the user of the mobile terminal.

26. The apparatus of claim 25 wherein the default location profile is used in all location-sensitive application requests made by the user of the mobile terminal.

27. The apparatus of claim 25 wherein the apparatus is further caused to pre-program the default location to automatically change.

28. The apparatus of claim 21 further comprising an interface for a World Wide Web interface.

29. A non-transitory computer-readable storage medium carrying one or more sequences of one or more instructions which, when executed by one or more processors, cause an apparatus to at least perform the following steps: receiving at least one location profile defined by a user of a mobile terminal, wherein the at least one location profile is stored in a wireless network node, and each of the at least one location profiles is associated with a respective location and is stored for subsequent selection by the user; setting for the user without user intervention one of the at least one location profile as a current location profile by applying an application logic of one or more user locations, one or more time points, or a combination thereof; and determining to invoke at least one service to receive location-sensitive content that is tailored to a location associated with the current location profile.

30. The non-transitory computer-readable storage medium of claim 29, wherein the at least one location profile is bookmarked at the apparatus.

31. The non-transitory computer-readable storage medium of claim 28, wherein the wireless network node is a wireless application protocol (WAP) server.

* * * * *